UNITED STATES PATENT OFFICE 2,541,469

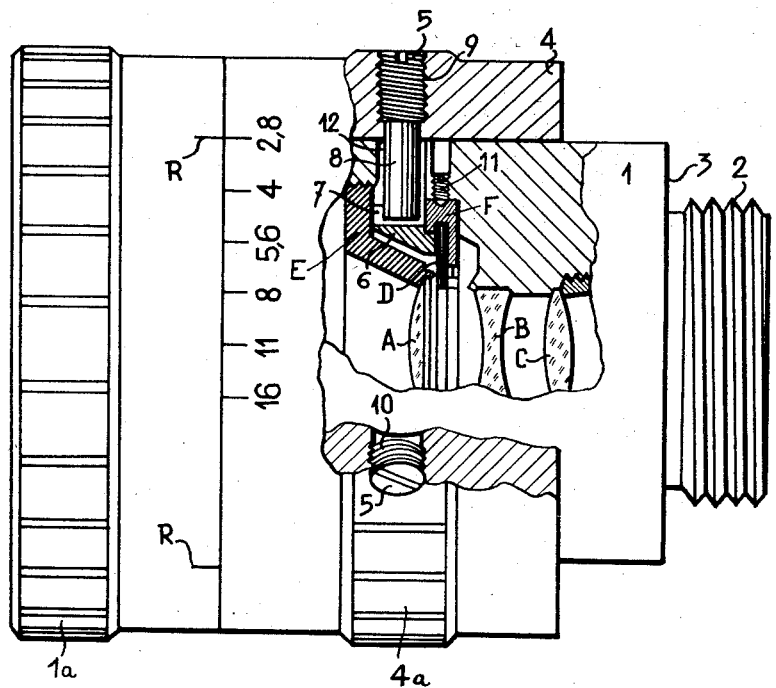

LENS MOUNT FOR CAMERAS

Eric Guinchard, Yverdon, Switzerland, assignor to Paillard S. A., a corporation of Switzerland Application December 13, 1949, Serial No. 132,712
In Switzerland September 5, 1949

4 Claims. (Cl. 88—57)

My invention has for its object a lens mount for photographic or cinematographic cameras chiefly of the type providing a constant focusing, and including a diaphragm controlled by a rotary ring carrying at least one scale adapted to move in front of a mark. Usually in such cameras, the lens mount is provided with a threaded part arranged coaxially with reference to the optic axis of the lens, said threaded part projecting beyond a shoulder rigid therewith. Such a lens mount is therefore adapted to be screwed into the camera so that its shoulder may abut against a corresponding portion of the camera.

In such apparatuses, the focusing is generally provided in the mounting for a so-called hyperfocal distance that is calculated for the maximum opening of the lens. In practice, said focusing is obtained conveniently through a slight modification of the location of the lens shoulder in order to bring the focus into the plane of the film.

This very rapid and simple procedure leads, however, to considerable variations in the angular position of the lens mount with reference to the camera, the reason thereof being that a modification in the position of the lens mount shoulder with reference to the beginning of the thread in the camera body produces simultaneously a modification in the length of threaded engagement between the lens mount and the camera whereby the scales provided on the lens mount risk entering positions in which they are difficult to read for the operator.

Certain camera designers have proposed inserting twice the same scale on the outer ring of the lens mount, the scales being shifted by 180° with reference to one another. This manner of providing scales leads, however, to the drawback of overloading the mounting with scales without entirely reaching the result sought for.

My invention has for its object to solve this problem in a more satisfactory manner.

According to said invention, the rotary diaphragm-controlling ring is provided over the periphery of a predetermined cross-section with at least two radial perforations angularly shifted with reference to one another and of which one is selectively adapted to engage a diaphragm-controlling member according to which position of the rotary ring is more advantageous for the reading of the scale by the operator, while the other perforation is closed by a suitable cover.

The single figure of the accompanying drawing illustrates partly in side view and partly in longitudinal cross-section an embodiment of a lens mount according to my invention, said embodiment being shown and described by way of a mere exemplification.

The lens illustrated includes an optic system constituted by the lenses A, B, C and by the diaphragm D, the lens A being mounted in a supporting ring E. Said optic system is provided with a threaded sleeve 2 rigid with a shoulder 3.

This threaded sleeve 2 serves for screwing to a varying extent the lens mount into a camera body provided with a corresponding tapping. The shoulder 3 abuts then against the camera which provides for the focusing of the lens at the above mentioned so-called hyperfocal distance that is calculated for the maximum diaphragm opening of the lens. This focusing of the lens may be performed for instance through removal of an extra thickness of material provided on the shoulder 3 or else through the insertion of gauged shims or washers. For controlling the diaphragm D located inside the lens mount, there is provided a rotary ring having a knurled portion 4a, said ring 4 carrying a scale and adapted to turn round the lens mount 1 which is provided with a knurled portion 1a. In the embodiment illustrated, said rotary ring 4 is provided with three perforations 5 arranged radially in a common plane perpendicular to the axis of the lens mount and distributed regularly over the periphery of the ring, that is at 120° with reference to one another. Furthermore, three stationary marks R are distributed at the periphery of the optic system at 120° with reference to one another, and registering with the scale of diaphragm openings on the ring.

Inside the lens mount 1, the diaphragm D is mounted in a ring F, said ring being secured in the lens mount by a screw 11. The diaphragm D is provided with an inner ring 6 controlling the iris diaphragm that is of an ordinary type of standard design and need not, therefore, be described with any further detail. This inner ring 6 is provided with a notch 7 adapted to receive a pin 8 secured inside the rotary ring 4 and passing through a radial slot 12 provided in the lens mount. Said pin 8 provides consequently for the synchronous rotation of the two rings 4 and 6. In the present embodiment, the perforations 5 are tapped which allows associating therewith pins 8 having a threaded head 9. After focusing the lens on the camera, as disclosed precedingly, it is sufficient to select the perforation 5 that for a given mark R provides the easiest reading of the scale on the camera with said mark after which a pin 8 is screwed into the selected perforation in order to make the two rings 4 and 6 rigid with one another. The perforations that are not used for the insertion of a pin 8 are closed by screw plugs such as 10.

I claim:

1. In combination with a lens mount adapted to be screwed onto a camera and having a peripheral slot, the provision of a diaphragm, an outer rotary ring adapted to control the diaphragm, and to be angularly shifted round the lens mount, a single scale of diaphragm openings carried by said ring, at least two marks on the object lens mount to register with the scale on the ring, an inner ring controlling the opening of the diaphragm and means movable in the slot and connecting said rings for selectively securing said outer ring in one of at least two positions to the inner ring.

2. In a camera, the combination of a diaphragm, a lens including a lens mount, adapted to be screwed to a varying extent into the camera body and having a peripheral slot, surrounding the diaphragm and carrying at least two marks, an outer ring mounted revolubly round the lens mount and provided with a single scale of diaphragm openings registering with the mark on the lens mount and with at least two radial bores angularly shifted with reference to one another, an inner ring controlling the opening of the diaphragm, a radial member movable in the slot and adapted to be fitted selectively in one of said bores and to be operatively connected with the inner ring for controlling the diaphragm opening in accordance with the angular shifting given to the outer ring and associated radial member.

3. In a camera, the combination of a diaphragm, a lens including a lens mount, adapted to be screwed to a varying extent into the camera body and having a peripheral slot, surrounding the diaphragm and carrying three marks at 120° from one another, an outer ring mounted revolubly round the lens mount and provided with a single scale of diaphragm openings registering with the marks on the lens mount for selective reading with one of said marks and with three radial bores angularly shifted by 120° with reference to one another, an inner ring controlling the opening of the diaphragm, a radial member movable in the slot and adapted to be fitted selectively in one of said bores and to be operatively connected with the inner ring for controlling the diaphragm opening in accordance with the angular shifting given to the outer ring and associated radial member.

4. In a camera, the combination of a diaphragm, a lens including a lens mount, adapted to be screwed to a varying extent into the camera body and having a peripheral slot, surrounding the diaphragm and carrying at least two marks, an outer ring mounted revolubly round the lens mount and provided with a single scale of diaphragm openings registering with the marks on the lens mount and with at leasts two tapped bores angularly shifted with reference to one another, an inner ring controlling the opening of the diaphragm, a radial member movable in the slot and adapted to be threadedly engaged selectively in one of said bores and to be operatively connected with the inner ring for controlling the diaphragm opening in accordance with the angular shifting given to the outer ring and associated radial member and means for closing the ring bores that are not provided with a radial member at the moment considered.

ERIC GUINCHARD.

REFERENCES CITED

The following references are of record in the file of this patent:

UNITED STATES PATENTS

| Number | Name | Date |
| --- | --- | --- |
| 1,848,402 | Wollensak | Mar. 8, 1932 |
| 2,000,811 | Wollensak | May 7, 1935 |
| 2,279,476 | Mihalyi | Apr. 14, 1942 |
| 2,322,034 | Lee | June 15, 1943 |
| 2,328,157 | Luneburg | Aug. 31, 1943 |
| 2,465,578 | Czarnikow et al. | Mar. 29, 1949 |